(12) United States Patent
Nakagawa

(10) Patent No.: US 8,814,431 B2
(45) Date of Patent: Aug. 26, 2014

(54) SIDE SEAL OF LINEAR GUIDE

(75) Inventor: Takumi Nakagawa, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/817,288

(22) PCT Filed: Jul. 25, 2011

(86) PCT No.: PCT/JP2011/004185
§ 371 (c)(1),
(2), (4) Date: Feb. 15, 2013

(87) PCT Pub. No.: WO2012/023238
PCT Pub. Date: Feb. 23, 2012

(65) Prior Publication Data
US 2013/0142459 A1    Jun. 6, 2013

(30) Foreign Application Priority Data

Aug. 19, 2010   (JP) ................... 2010-183969

(51) Int. Cl.
*F16C 29/06* (2006.01)

(52) U.S. Cl.
USPC .............................. 384/15; 384/45

(58) Field of Classification Search
CPC . F16C 29/084; F16C 29/086; B23Q 11/0875; B23Q 11/0883
USPC .................................... 384/15, 45
See application file for complete search history.

(56) References Cited

U.S. PATENT DOCUMENTS

| | | |
|---|---|---|
| 5,149,204 A | 9/1992 | Tennichi |
| 6,715,920 B2 * | 4/2004 | Menges et al. .................. 384/45 |
| 2005/0051558 A1 | 3/2005 | Hagano et al. |
| 2008/0123261 A1 | 5/2008 | Maegawa et al. |

FOREIGN PATENT DOCUMENTS

| | | |
|---|---|---|
| CN | 101042160 A | 9/2007 |
| CN | 101725638 A | 6/2010 |
| EP | 1 512 572 A2 | 3/2005 |
| JP | 2005-153661 A | 6/2005 |
| JP | 2007-211900 A | 8/2007 |
| JP | 2007-309364 A | 11/2007 |
| JP | 2008-1225 A | 1/2008 |
| JP | 2008-151325 A | 7/2008 |

OTHER PUBLICATIONS

Chinese Office Action with English translation dated Oct. 24, 2013 (eleven (11) pages).

(Continued)

*Primary Examiner* — Thomas R Hannon
(74) *Attorney, Agent, or Firm* — Crowell & Moring LLP

(57) ABSTRACT

A side seal attached to each of both ends of a slider of a linear guide in a sliding direction and sliding in contact with a guide rail includes: a seal main body formed by shaping an elastic material using a mold and sliding in contact with the guide rail; and a holder for housing and holding the seal main body. A gate burr housing for an elastic-material gate burr of the seal main body is formed in a seal main body holder housing. This eliminates the need of complete cutting or elimination of the elastic-material gate burr of the seal main body, and improves assembling performance. The gate burr housing is formed at a front or rear side of the seal main body housing of the holder, and the elastic-material gate burr of the seal main body is formed at a corresponding portion to the gate burr housing.

2 Claims, 3 Drawing Sheets

(56) References Cited

OTHER PUBLICATIONS

International Search Report with English translation dated Oct. 11, 2011 (two (2) pages).
Japanese-language Written Opinion (PCT/ISA/237) (three (3) pages).
English translation of International Preliminary Report on Patentability (PCT/IB/338 and PCT/IB/373) and Written Opinion (PCT/ISA/237) (Six (6) pages).
Japanese Office Action dated Jul. 15, 2014, with English translation (Fourteen (14) pages).

* cited by examiner

FIG. 3A    FIG. 3B
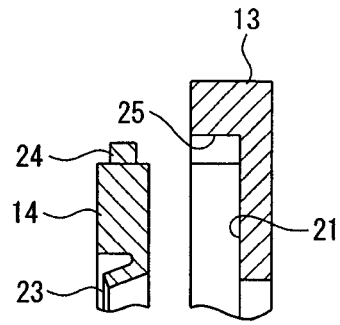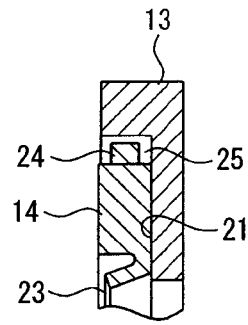
FIG. 4
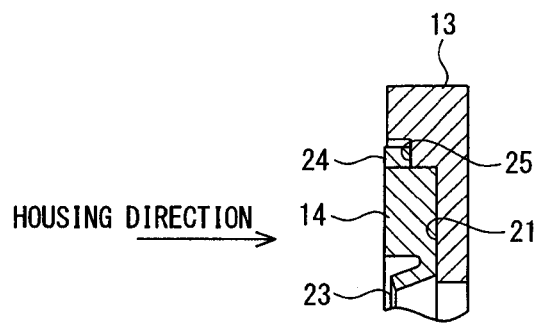
FIG. 5
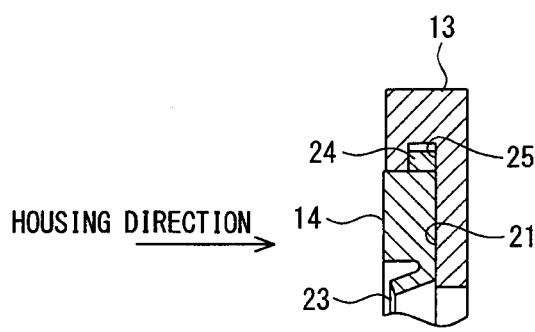

SIDE SEAL OF LINEAR GUIDE

TECHNICAL FIELD

The present invention relates to side seals for linear guides, and more specifically to side seals attached to both ends in the sliding direction of a slider that slides along a guide rail, and in contact with the guide rail to prevent entrance of foreign materials such as refuses.

BACKGROUND ART

Side seals to be attached to the slider of a linear guide have a structure such that a seal main body formed of an elastic material such as elastomer is sandwiched between a holder and a cover as disclosed in, for example, the following Patent Document 1. According to such a structure, the soft seal main body is held between the hard holder and cover so that an assembly can be made. This facilitates handling of such an assembly at the time of assembling and improves the assembling precision.

PRIOR ART DOCUMENT

Patent Document

Patent Literature 1: JP 2007-211900 A

SUMMARY OF THE INVENTION

Problem to be Solved

When the elastic material such as elastomer is shaped by pouring such an elastic material in a mold through injection molding or casting, a gate burr that is a sprue gate of the elastic material is formed. However, it takes a large amount of labor work to completely cut or eliminate the gate burr so as to be made flat with a surface of the seal main body.

The present invention has been made in view of the above-explained technical issue, and it is an object of the present invention to provide a side seal of the linear guide which needs no complete cutting or elimination of the gate burr of a seal main body and which is good at assembling performance.

Solution to the Problem

To achieve the above object, there is provided a side seal of a linear guide attached to each of both ends of a slider of the linear guide in a sliding direction of the slider and sliding in contact with a guide rail, the side seal comprising: a seal main body formed by shaping an elastic material using a mold, and sliding in contact with the guide rail; and a holder for housing and holding the seal main body, a gate burr housing for housing an elastic-material gate burr of the seal main body being formed in a seal main body housing of the holder.

Moreover, when it is presumed that a forward side of a direction in which the seal main body is held in the holder is a rear side and a backward side of the direction in which the seal main body is held is a front side, the gate burr housing may be formed at a front side of the seal main body housing of the holder, and the elastic-material gate burr of the seal main body may be formed at a corresponding portion to the gate burr housing.

In addition, when it is presumed that a forward side of a direction in which the seal main body is held in the holder is a rear side and a backward side of the direction in which the seal main body is held is a front side, the gate burr housing may be formed at a rear side of the seal main body housing of the holder and the elastic-material gate burr of the seal main body may be formed at a corresponding portion to the gate burr housing.

Moreover, a cover may cover the seal main body housed in the seal main body housing of the holder.

Advantageous Effects of the Invention

The side seal of the linear guide according to an embodiment of the present invention is attached to each of both ends of a slider of the linear guide in a sliding direction of the slider and sliding in contact with a guide rail, the side seal comprising: a seal main body formed by shaping an elastic material using a mold, and sliding in contact with the guide rail; and a holder for housing and holding the seal main body, a gate burr housing for housing an elastic-material gate burr of the seal main body being formed in a seal main body housing of the holder. According to such a structure, it becomes unnecessary to completely cut or eliminate the elastic-material gate burr of the seal main body. Accordingly, the labor work can be reduced by what corresponds to such unnecessity, and the elastic-material gate burr of the seal main body can be simply housed in the gate burr housing of the seal main body housing of the holder, thereby improving the workability.

Moreover, when it is presumed that a forward side of a direction in which the seal main body is held in the holder is a rear side and a backward side of the direction in which the seal main body is held is a front side, the gate burr housing may be formed at a front side of the seal main body housing of the holder, and the elastic-material gate burr of the seal main body may be formed at a corresponding portion to the gate burr housing. According to such a structure, the elastic-material gate burr can be used to distinguish the orientation of the seal main body such as the front and rear sides and to prevent a false assembling, thereby improving the assembling performance.

Furthermore, when it is presumed that a forward side of a direction in which the seal main body is held in the holder is a rear side and a backward side of the direction in which the seal main body is held is a front side, the gate burr housing may be formed at a rear side of the seal main body housing of the holder and the elastic-material gate burr of the seal main body may be formed at a corresponding portion to the gate burr housing. According to such a structure, the elastic-material gate burr can be used to distinguish the orientation of the seal main body such as the front and rear sides and to prevent a false assembling, thereby improving the assembling performance, while at the same time, preventing the seal main body from being dropped off from the holder.

Still further, the side seal of the linear guide may further include a cover for covering the seal main body housed in the seal main body housing of the holder. According to such a structure, the side seal can be made as an assembly, which facilitates the handling at the time of assembling and improves the assembling precision.

BRIEF DESCRIPTION OF THE DRAWINGS

FIGS. 3A and 3B are each a vertical cross-sectional view of the side seal shown in FIG. 2;

FIG. 4 is a vertical cross-sectional view showing aside seal of the linear guide according to a second embodiment; and FIG. 5 is a vertical cross-sectional view showing a side seal of the linear guide according to a third embodiment.

DESCRIPTION OF EMBODIMENTS

Next, an explanation will be given of a side seal of a linear guide according to a first embodiment with reference to the accompanying drawings.

Figure 1:
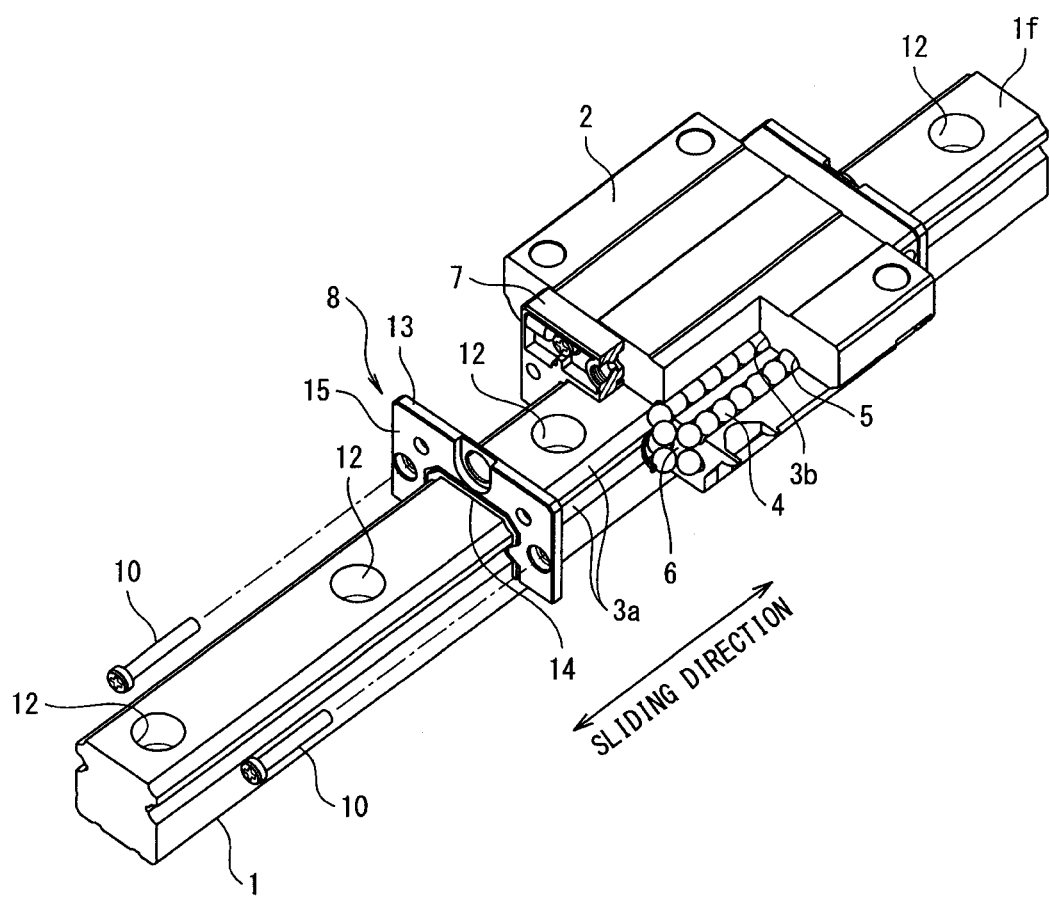
FIG. 1 is an overall perspective view of a linear guide showing side seals for the linear guide according to a first embodiment.

FIG. 1 is a perspective view showing an overall structure of a linear guide using a side seal according to the present embodiment. The linear guide includes: a lengthened guide rail 1 having a substantially rectangular cross section; and a slider 2 which is mounted and provided on the guide rail 1 in a slidable manner in the lengthwise direction of the guide rail and which has a substantially letter U-shaped lateral cross section. The guide rail 1 has ball guiding grooves 3a which are formed of two inclined surfaces formed in the lengthwise direction of the guide rail to be adjacent to each other and having a substantially triangular cross section and which are formed in each side face of the guide rail orthogonal to the lengthwise direction. The guide rail 1 also has a plurality of attachment openings 12 opened at a top face 1f of the guide rail and formed along the lengthwise direction. Each attachment opening 12 has: a counterbore opened at the top face 1f of the guide rail 1; and a through-hole formed coaxially with the counterbore and penetrating through the guide rail 1 to reach the bottom face thereof. A washer-faced bolt is inserted in this attachment opening 12, and is engaged and tightened with an attaching object, thereby securing the guide rail 1 to the attaching object.

As explained above, the guide rail 1 has the ball guiding grooves 3a formed in both side faces of the guide rail in the lengthwise direction thereof, and the slider 2 has ball guiding grooves 3b facing with respective ball guiding grooves 3a of the guide rail 1 and formed in respective internal side faces of the slider. A plurality of balls 4 that are rolling elements are rollably loaded between each ball guiding groove 3a and each ball guiding groove 3b. Moreover, the slider 2 has through-holes 5 which are substantially parallel with respective ball guiding grooves 3b and which allow the balls 4 to pass through. To guide the balls 4 between the through-hole 5 and the ball guiding groove 3b, a return guide 6 and an end cap 7 are attached to each of ends of the slider 2 in the sliding direction (indicated by an arrow in FIG. 1).

Figure 2:
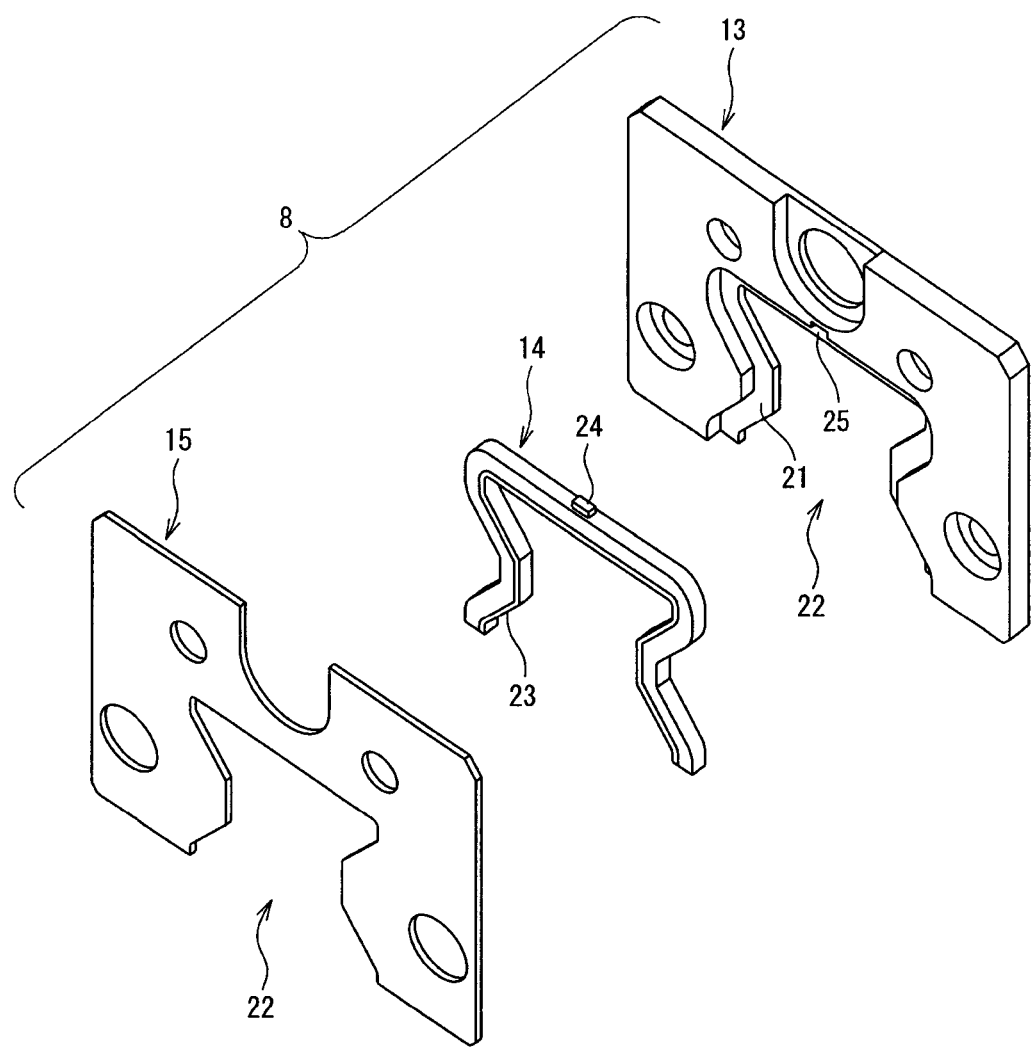
FIG. 2 is a perspective view showing the detail of a side seal of the linear guide shown in FIG. 1.

Furthermore, each end cap 7 is attached with a side seal 8 at the end in the sliding direction. The side seal 8 is in contact with the top face 1f of the guide rail 1 and the ball guiding grooves 3a thereof, thereby preventing foreign materials such as refuses sticking to those top face and ball guiding grooves from entering into the slider 2. FIG. 2 shows a specific structure of the side seal 8. The side seal 8 includes: a holder 13 attached to the end cap 7 by bolts 10 (see FIG. 1); a seal main body 14 housed in a seal main body housing 21 formed in the holder 13; and a cover 15 which covers the seal main body 14 housed in the seal main body housing 21 and which is secured the holder 13 by unillustrated securing members.

The holder 13 is formed of a relatively thin metal plate in a substantially rectangular shape, and has a cut out portion 22 which is formed in the lower center part shown in the figure and which permits the top face 1f of the guide rail 1 and the ball guiding grooves 3a thereof to pass through with a predetermined clearance. The periphery of the cut out portion 22 is recessed to form the seal main body housing 21 for housing therein the seal main body 14.

The seal main body 14 is formed in a shape corresponding to the periphery of the cut out portion 22, and has a lip 23 formed in the internal side face to slide in tight contact with the top face 1f of the guide rail 1 and the ball guiding grooves 3a thereof. The seal main body 14 is formed by pouring an elastic material such as elastomer in a mold by injection molding or casting, and has an elastic-material gate burr 24 which is the sprue of the elastic material and which is formed in the upper center part shown in FIG. 2. The seal main body housing 14 of the holder 13 is continuously provided with a gate burr housing 25 for housing therein the elastic-material gate burr 24, but the detail of such a gate burr housing will be discussed later.

The cover 15 is formed of a thin synthesized resin plate in a substantially rectangular shape, and has a cut out portion 22 such as the holder 13 which is formed in the lower center part shown in the figure and which permits the top face if of the guide rail 1 and the ball guiding grooves 3a thereof to pass through with a predetermined clearance. The upper center of the cover 15 shown is also cut in a letter U-shape, but it is to allow a grease supply opening, not illustrated, to be attached with the end cap 7 thorough the holder 13.

As explained above, the seal main body housing 21 of the holder 13 according to the present embodiment is continuously provided with the gate burr housing 25 for housing therein the elastic-material gate burr 24 of the seal main body 14. FIG. 3 shows the detail of such a housing. FIG. 3A shows a condition before the seal main body 14 is housed in the seal main body housing 21, and FIG. 3B shows a condition in which the seal main body 14 is housed in the seal main body housing 21. It takes a large amount of labor work to completely cut or eliminate the elastic-material gate burr 24 formed with the thin component or the small component such as the seal main body 14 according to the present embodiment so as to form a so-called flat plane. Hence, according to the present embodiment, as shown in FIG. 3A, the gate burr housing 25 for housing the elastic-material gate burr 24 of the seal main body 14 is continuously provided with the seal main body housing 21 of the holder 13. As shown in FIG. 3B, when the seal main body 14 is housed in the seal main body housing 21 of the holder 13, the elastic-material gate burr 24 of the seal main body 14 is automatically housed in the gate burr housing 25. Accordingly, the labor work for completely cutting or eliminating the elastic-material gate burr 24 can be made unnecessary, while at the same time, the assembling workability is improved.

As explained above, according to the side seal of the linear guide according to the present embodiment, the side seals 8 which slides in contact with the guide rail 1 are respectively attached to both ends of the slider 2 of the linear guide in the sliding direction. Each side seal includes the seal main body 14 which is formed by shaping the elastic material using a mold and which slide in contact with the guide rail 1, and the holder 13 for housing and holding the seal main body 14. The gate burr housing 25 for housing therein the elastic-material gate burr 24 of the seal main body 14 is formed in the seal main body housing 21 of the holder 13. Accordingly, it becomes unnecessary to completely cut or eliminate the elastic-material gate burr 24 of the seal main body 14, and the labor work can be reduced by what corresponds to such unnecessity. Moreover, the workability is also improved since it is fine if the elastic-material gate burr 24 of the seal main body 14 is just put in the gate burr housing 25 of the seal main body housing 21 of the holder 13.

Moreover, the seal main body 14 housed in the seal main body housing 21 of the holder 13 is covered by the cover 15, and thus the side seal 8 can be made as an assembly. This facilitates the handing at the time of assembling, and improves the assembling precision.

FIG. 4 shows the detail of a side seal of a linear guide according to a second embodiment of the present invention. Like FIG. 3B of the first embodiment, FIG. 4 shows a condition in which a seal main body 14 is housed in a seal main body housing 21. The linear guide according to the present embodiment has a general structure that is same as that of the first embodiment shown in FIG. 1, and thus the detailed explanation thereof will be omitted. Moreover, the side seal according to the present embodiment has a general structure that is same as that of the first embodiment shown in FIG. 2, and thus the detailed explanation thereof will be omitted.

According to the present embodiment, also, the seal main body 14 is housed in the seal main body housing 21 of a holder 13, but at that time, when it is presumed that a forward side of a direction in which the seal main body 14 is held in the holder 13 (indicated by an arrow in FIG. 4) is a rear side and a backward side of the direction in which the seal main body is held is a front side, a gate burr housing 25 of the holder 13 is formed at the front side of the seal main body housing 21, and an elastic-material gate burr 24 of the seal main body 14 is formed at a portion corresponding to the gate burr housing 25, i.e., at the front side of the direction in which the seal main body 14 is housed.

When, for example, such as the seal main body 14 according to the present embodiment, the contour in the horizontal direction is symmetrical as shown in FIG. 2, and the front and rear faces of the seal main body 14 are distinguished such as the orientation of a lip 23, if the seal main body is assembled with a false orientation of the front and rear sides, i.e., falsely assembled, the seal main body 14 cannot fully accomplish its function in some cases. When, for example, a gate burr housing 25 is formed at the front side of the seal main body housing 21 of the holder 13 and an elastic-material gate burr 24 of the seal main body 14 is formed at a corresponding portion to the gate burr housing 25, i.e., at the front side of the seal main body 14 in the direction in which the seal main body is housed like the present embodiment, a possibility that the seal main body 14 is assembled with a false orientation of the front and rear sides, i.e., the possibility of a false assembling can be reduced, thereby improving the assembling performance.

As explained above, according to the side seal of the linear guide of this embodiment, when it is presumed that a forward side of a direction in which the seal main body 14 is held in the holder 13 is a rear side and a backward side of the direction in which the seal main body is held is a front side, if the gate burr housing 25 is formed at the front side of the seal main body housing 21 of the holder 13 and the elastic-material gate burr 24 of the seal main body 14 is formed at a corresponding portion to the gate burr housing 25, the elastic-material gate burr 24 can be used to distinguish the orientation of the seal main body 14 such as the front and rear sides and to prevent a false assembling, thereby improving the assembling performance.

FIG. 5 shows the detail of a side seal of a linear guide according to a third embodiment of the present invention. FIG. 5 shows a condition in which a seal main body 14 is housed in a seal main body housing 21 such as FIG. 3B according to the first embodiment. The linear guide according to the present embodiment has a general structure that is same as that of the first embodiment shown in FIG. 1, and thus the detailed explanation thereof will be omitted. Moreover, the side seal according to this embodiment has a general structure that is same as that of the first embodiment shown in FIG. 2, and thus the detailed explanation thereof will be omitted.

According to the present embodiment, also, the seal main body 14 is housed in the seal main body housing 21 of a holder 13, and at that time, when it is presumed that a forward side of a direction in which the seal main body 14 is held in the holder 13 (indicated by an arrow in FIG. 5) is a rear side and a backward side of the direction in which the seal main body is held is a front side, a gate burr housing 25 is formed at the rear side of the seal main body housing 21 of the holder 13, and an elastic-material gate burr 24 of the seal main body 14 is formed at a corresponding portion to the gate burr housing 25, i.e., the rear side of the seal main body 14 in the direction in which the seal main body is housed.

According to the present embodiment, when, such as the second embodiment, the front and rear faces of the seal main body 14 are distinguished such as an orientation of a lip 23, if the seal main body is assembled with a false orientation of the front and rear sides, i.e., falsely assembled, the seal main body 14 cannot fully accomplish its function. When, for example, a gate burr housing 25 is formed at the rear side of the seal main body housing 21 of the holder 13 and an elastic-material gate burr 24 of the seal main body 14 is formed at a corresponding portion to the gate burr housing 25, i.e., at the rear side of the seal main body 14 in which the seal main body is housed, the possibility that the seal main body 14 is assembled with a false orientation of the front and rear sides, i.e., the possibility of false assembling can be reduced, thereby improving the assembling performance.

Moreover, according to the present embodiment, the elastic-material gate burr 24 of the seal main body 14 is pushed in and housed in the gate burr housing 25 formed at the rear side of the seal main body housing 21. Thus, the elastic-material gate burr 24 is engaged with the step difference at the front side of the gate burr housing 25 in which the seal main body is housed and serves as a stopper. Hence, it becomes possible to prevent the seal main body 14 from being dropped off from the holder 13.

As explained above, according to the side seal of the linear guide according to the present embodiment, when it is presumed that a forward side of a direction in which the seal main body 14 is held in the holder 13 is a rear side and a backward side of the direction in which the seal main body is retained is a front side, the gate burr housing 25 is formed at a rear side of the seal main body housing 21 of the holder 13 and the elastic-material gate burr 24 of the seal main body 14 is formed at a corresponding portion to the gate burr housing 25, the elastic-material gate burr 24 can be used to distinguish the orientation of the seal main body 14 such as the front and rear sides and to prevent false assembling. Therefore, this improves the assembling performance, while at the same time, preventing the seal main body 14 from being dropped off from the holder 13.

The forms of the seal main body, the holder, and the cover are not limited to the ones explained in the above embodiments, and the present invention is applicable to the side seal of the linear guide in any forms.

REFERENCE SIGNS LIST

1 Guide rail
2 Slider
3a, 3b Ball guiding groove
4 Ball
5 Through-hole
6 Return guide
7 End cap
8 Side seal
10 Bolt 12 Attachment opening
13 Holder
14 Seal main body
15 Cover
21 Seal main body housing
22 Cut section
23 Lip
24 Elastic-material gate burr
25 Gate burr housing

The invention claimed is:

1. A side seal of a linear guide attached to one of both ends of a slider of the linear guide in a sliding direction of the slider and sliding in contact with a guide rail, the side seal comprising:
 a seal main body formed by shaping an elastic material using a mold, and sliding in contact with the guide rail; and
 a holder that houses and holds the seal main body,
 a gate burr housing that houses an elastic-material gate burr of the seal main body being formed in a seal main body housing of the holder, wherein
 the seal main body includes a first face perpendicular to a thickness direction of the seal main body and in contact with the holder, a second face opposite to the first face, and a top face perpendicular to both of the first face and the second face,
 the holder includes a third face perpendicular to the thickness direction and facing toward the slider and a fourth face facing the top face,
 the elastic-material gate burr is formed on a first portion of the top face, the first portion being near the first face, and the elastic-material gate burr protrudes more than a second portion of the top face, the second portion being near the second face and adjacent to the first portion in the thickness direction, and
 the gate burr housing is formed on a third portion of the fourth face, the third portion being near the third face, and the gate burr housing is recessed more than the fourth portion of the fourth face, the fourth portion being farther from the third face than the third portion and adjacent to the third portion in the thickness direction.

2. The side seal of the linear guide according to claim 1, further comprising a cover that covers the seal main body housed in the seal main body housing of the holder.

* * * * *